US011128240B1

(12) United States Patent
Tang et al.

(10) Patent No.: US 11,128,240 B1
(45) Date of Patent: Sep. 21, 2021

(54) REDUCED VOLTAGE SOFT STARTER APPARATUS AND METHODS USING CURRENT-CONTROLLED TRANSITIONS

(71) Applicant: Eaton Intelligent Power Limited, Dublin (IE)

(72) Inventors: Hanning Tang, Asheville, NC (US); Benjamin Stewart Wells, Arden, NC (US); Stan Rex Simms, Arden, NC (US); Thomas A. Farr, Candler, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/992,912

(22) Filed: Aug. 13, 2020

(51) Int. Cl.
*H02P 1/28* (2006.01)

(52) U.S. Cl.
CPC ...................................... *H02P 1/28* (2013.01)

(58) Field of Classification Search
USPC ........................................................ 318/560
See application file for complete search history.

(56) References Cited

U.S. PATENT DOCUMENTS

| | | |
|---|---|---|
| 2,994,028 A | 7/1961 | Dortort |
| 3,018,380 A | 1/1962 | Bright et al. |
| 3,525,922 A | 8/1970 | Abbey |
| 3,796,941 A | 3/1974 | Danz et al. |
| 4,072,880 A | 2/1978 | Oshima et al. |
| 4,100,469 A | 7/1978 | Nelson et al. |
| 4,284,936 A * | 8/1981 | Bailey ...................... H02P 3/08 318/381 |
| 4,469,998 A | 9/1984 | Nola |
| 4,634,951 A | 1/1987 | Kampf et al. |
| 4,647,285 A | 3/1987 | Profio et al. |
| 4,710,692 A | 12/1987 | Libert et al. |
| 4,743,816 A * | 5/1988 | Prather ...................... H02P 1/28 318/430 |
| 4,767,975 A | 8/1988 | Unsworth |
| 4,800,326 A | 1/1989 | Unsworth |
| 4,833,386 A | 5/1989 | Unsworth |
| 4,833,628 A | 5/1989 | Curran, Jr. |
| 4,912,390 A | 3/1990 | Curran, Jr. et al. |
| 4,943,890 A | 7/1990 | Schaltenbrand et al. |
| 4,978,897 A | 12/1990 | Merrison et al. |
| 4,996,469 A | 2/1991 | DeLange et al. |
| 5,003,241 A | 3/1991 | Rowan et al. |
| 5,003,242 A | 3/1991 | Liber |

(Continued)

OTHER PUBLICATIONS

WEG, Soft-Starter User Manual, SSW-06, 2 pages.

(Continued)

*Primary Examiner* — Bentsu Ro
(74) *Attorney, Agent, or Firm* — Stanek Lemon Crouse & Meeks, P.A.

(57) ABSTRACT

A motor starter includes a plurality of semiconductor switches configured to couple respective phases of an AC power source to respective phases of a motor and a control circuit configured to configured to selectively operate the semiconductor switches to gradually increase a voltage applied to the motor, to determine root mean square (RMS) current values of a current of the motor as the voltage increases, and to cause the semiconductor switches to apply a full voltage or a more steeply ramping voltage to the motor responsive to the RMS current values meeting a criterion.

20 Claims, 8 Drawing Sheets

(56) References Cited

U.S. PATENT DOCUMENTS

| | | | |
|---|---|---|---|
| 5,008,608 A | | 4/1991 | Unsworth et al. |
| 5,151,642 A | | 9/1992 | Lombardi et al. |
| 5,187,419 A | | 2/1993 | DeLange |
| 5,548,197 A | | 8/1996 | Unsworth et al. |
| 5,838,144 A | * | 11/1998 | Wills .................. H02M 5/2576 323/238 |
| 6,208,100 B1 | * | 3/2001 | Griesemer ........... H02H 7/0822 318/434 |
| 6,420,848 B1 | | 7/2002 | Gritter et al. |
| 6,803,741 B2 | | 10/2004 | Messersmith |
| 7,345,449 B2 | | 3/2008 | Barie et al. |
| 8,138,709 B2 | | 3/2012 | Messersmith et al. |
| 8,179,082 B2 | | 5/2012 | Li et al. |
| 8,390,238 B2 | | 3/2013 | Ek et al. |
| 8,519,662 B2 | | 8/2013 | Lu et al. |
| 8,547,050 B2 | | 10/2013 | Lu et al. |
| 9,350,275 B2 | | 5/2016 | Wei et al. |
| 9,685,898 B2 | | 6/2017 | Wei et al. |
| 2008/0067971 A1 | | 3/2008 | Qian et al. |
| 2009/0045762 A1 | * | 2/2009 | Hayashi .................... H02P 7/28 318/379 |
| 2010/0164579 A1 | * | 7/2010 | Acatrinei ............ H02M 1/4208 327/172 |
| 2011/0102012 A1 | | 5/2011 | Messersmith et al. |
| 2011/0291596 A1 | | 12/2011 | Lu et al. |
| 2013/0285592 A1 | | 10/2013 | Johnson et al. |
| 2014/0145667 A1 | | 5/2014 | Damjanovic |

OTHER PUBLICATIONS

Rockwell Automation Publication 1560E-UM051G-EN-P, Medium Voltage SMC™ Flex Motor Controller for Series K (or later), Mar. 2015, p. 2 and p. 167.

Gritter et al., Soft Starter inside Delta Motor Modeling and Its Control, 2000 IEEE Industry Applications Conference, 35$^{th}$ IAS Annual Meeting and World Conference on Industrial Applications of Electrical Energy (Cat. No. 00CH37129), 5 pages.

* cited by examiner

REDUCED VOLTAGE SOFT STARTER APPARATUS AND METHODS USING CURRENT-CONTROLLED TRANSITIONS

BACKGROUND

The inventive subject matter relates to motor drives and methods of operating the same and, more particularly, to apparatus and methods for speed control of motors.

Speed control of an AC motor can be implemented using adjustable frequency drives (AFDs) or reduced voltage soft starters (RVSSs). RVSSs are typically less complex and expensive than AFDs and are commonly used in applications in which it is desired to gradually ramp the motor up to full speed and/or gradually decelerate the motor from full speed. RVSSs can be used to reduce motor inrush current and torque pulsation or ripple in comparison to what might occur if full source voltage were to be instantaneously applied to or removed from the motor.

A typical RVSS includes pairs of antiparallel-connected thyristors coupled between an AC source and the motor. The thyristors are selectively fired for variable durations to control voltage and current applied to the motor. In "alpha" control schemes, a thyristor is triggered "on" after a delay, typically expressed as an angle $\alpha$ (alpha) of the AC cycle following a zero crossing of the source voltage. The thyristor commutates off again with reverse voltage after the current though the device goes to zero. The voltage and current supplied to the motor can be varied by varying a, with a typical motor startup procedure involving gradually decreasing a to apply an increasing voltage ramp to the motor. When the motor reaches a desired speed, the RVSS may close a bypass contactor that bypasses the thyristors to directly connect the AC source to the motor. Alpha control techniques are described, for example, in U.S. Pat. No. 6,420,848 to Gritter et al.

SUMMARY

Some embodiments provide a motor starter including a plurality of semiconductor switches configured to couple respective phases of an AC power source to respective phases of a motor and a control circuit configured to configured to selectively operate the semiconductor switches to gradually increase a voltage applied to the motor, to determine root mean square (RMS) current values of a current of the motor as the voltage increases, and to cause the semiconductor switches to concurrently couple all of the phases of the AC power source to corresponding phases of the motor responsive to the RMS current values meeting a criterion. The criterion may include the RMS current values reducing to a value corresponding to about 135% or less of a rated full load current of the motor.

In some embodiments, the control circuit is configured to generate an AC reference signal from the AC power source and to generate the RMS current values once each cycle of the AC reference signal. The control circuit may be configured to generate per-phase RMS current values for each phase of motor for each cycle of the AC reference signal and to generate the RMS current values for each cycle of the AC reference signal by averaging the per-phase RMS values.

In some embodiments, the plurality of semiconductor switches may include a plurality of pairs of antiparallel-connected thyristors, respective ones of the pairs configured to couple respective ones of the phases of the AC power source to respective ones of the phases of the motor. The control circuit may be configured to turn on all of the thyristors to concurrently couple all of the phases of the AC power source to the corresponding phases of the motor responsive to the RMS current values meeting the criterion.

In further embodiments, the apparatus may further include a mechanical bypass switch configured to couple the AC power source to the motor and thereby bypass the plurality of semiconductor switches. The control circuit may be configured to initiate closure of the bypass switch responsive to the RMS current values meeting the criterion.

Additional embodiments provide methods of operating a motor starter including a plurality of semiconductor switches configured to couple respective phases of an AC power source to respective phases of a motor and a mechanical bypass switch configured to couple the AC power source to the motor and thereby bypass the plurality of semiconductor switches. The methods include selectively operating the semiconductor switches to gradually increase a voltage applied to the motor, determining root mean square (RMS) current values of a current of the motor as the voltage increases, and causing the semiconductor switches to concurrently couple all of the phases of the AC power source to corresponding phases of the motor responsive to the RMS current values meeting a criterion. The criterion may include the RMS current values reaching a value corresponding to about 135% or less of a maximum full load current (MFLC) of the motor.

According to some aspects, determining the RMS current values may include generating an AC reference signal from the AC power source and generating the RMS current values once each cycle of the AC reference signal. Generating the RMS current values once each cycle of the AC reference signal may include generating per-phase RMS current values for each phase of motor for each cycle of the AC reference signal and generating the RMS current values for each cycle of the AC reference signal by averaging the per-phase RMS values. According to further method aspects, the plurality of semiconductor switches may include a plurality of pairs of antiparallel-connected thyristors, respective ones of the pairs configured to couple respective ones of the phases of the AC power source to respective ones of the phases of the motor, and causing the semiconductor switches to concurrently couple all of the phases of the AC power source to the corresponding phases of the motor responsive to the RMS current values meeting a criterion may include turning on all of the thyristors to concurrently couple all of the phases of the AC power source to the corresponding phases of the motor responsive to the RMS current values meeting the criterion. The motor starter may further include a mechanical bypass switch configured to couple the AC power source to the motor and thereby bypass the plurality of semiconductor switches and the methods may further include initiating closure of the bypass switch responsive to the RMS current values meeting the criterion.

According to still further embodiments, a motor starter includes a plurality of semiconductor switches configured to couple respective phases of an AC power source to respective phases of a motor and a control circuit configured generate an AC reference signal from the AC power source, to operate the semiconductor switches to apply a first voltage ramp to the motor to accelerate the motor and to apply a second voltage ramp steeper than the first voltage ramp responsive to detecting a decrease in a current of the motor during execution of the first voltage ramp, wherein application of the second voltage ramp includes turning on individual pairs of the semiconductor switches for durations that increase as the second voltage ramp is executed but that are uniform for each given voltage cycle of the AC reference signal. A duration of the second voltage ramp may be substantially equal to a stator time constant of the motor. The motor starter may further include a mechanical bypass switch configured to couple the AC power source to the motor to bypass the plurality of semiconductor switches and the control circuit may be configured to initiate closure of the bypass switch responsive to the second voltage ramp. The control circuit may be configured to initiate closure of the bypass switch responsive to lapse of a predetermined time delay and/or responsive to a timing metric for the semiconductor switches reaching a predetermined threshold.

The second voltage ramp may have ramp rate of about 1.5 to about 5 times greater than a ramp rate of the first voltage ramp. The control circuit may be configured to detect a current of the motor and to initiate the second voltage ramp responsive to the detected current. The control circuit may be configured to initiate the second voltage ramp responsive to the detected current falling to about 270% of a maximum full load current of the motor.

Still further embodiments provide methods of operating a motor starter including a plurality of semiconductor switches configured to couple respective phases of an AC power source to respective phases of a motor. The methods include operating the semiconductor switches to apply a first voltage ramp to the motor to accelerate the motor, generating an AC reference signal from the AC power source, and operating the semiconductor switches to apply a second voltage ramp steeper than the first voltage ramp responsive to detecting a decrease in a current of the motor during execution of the first voltage ramp. Application of the second voltage ramp includes turning on individual pairs of the semiconductor switches for durations that increase as the second voltage ramp is executed but are uniform for each given voltage cycle of the AC reference signal.

Additional embodiments provide a motor starter including a plurality of semiconductor switches configured to couple respective phases of an AC power source to respective phases of a motor and a control circuit configured generate an AC reference signal from the AC power source, to operate the semiconductor switches to apply a first voltage ramp to the motor to decelerate the motor and to apply a second voltage ramp less steep than the first voltage ramp after application of the first voltage ramp, wherein application of the first voltage ramp includes turning on individual pairs of the semiconductor switches for durations that increase as the first voltage ramp is executed but that are uniform for each given voltage cycle of the AC reference signal. The first voltage ramp may have a duration of approximate one half of a stator time constant of the motor. The second voltage ramp may commence when a voltage applied to the motor reaches about 55% to about 65% of a voltage of the AC power source. The second voltage ramp may terminate when a voltage applied to the motor reaches about 20% of a voltage of the AC power source.

Additional embodiments provide methods of operating a motor starter including a plurality of semiconductor switches configured to couple respective phases of an AC power source to respective phases of a motor. The methods include generating an AC reference signal from the AC power source and operating the semiconductor switches to apply a first voltage ramp to the motor to decelerate the motor. Application of the first voltage ramp includes turning on individual pairs of the semiconductor switches for durations that increase as the first voltage ramp is executed but that are uniform for each given voltage cycle of the AC reference signal. The methods further include applying a second voltage ramp less steep than the first voltage ramp after application of the first voltage ramp.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that improved performance in starting a motor can be achieved by selective control of the thyristors (or other semiconductor switches) of an RVSS when a particular motor current state has been detected. In some embodiments, improved starting can be achieved by transitioning all of the semiconductor switches to an "on" state and initiating closure of a bypass switch responsive to a current measurement made using a "fast RMS" technique indicating that motor current has diminished to a level of around 135% or less of the motor's full rated load current. The fast RMS current determination may include generating per-cycle RMS current values for each cycle of an AC reference signal derived from the AC source powering the RVSS, and using these per-cycle RMS current values to determine whether the motor current has diminished to the up-to-speed detection (UTSD) threshold. These techniques can result in reduced torque ripple when transitioning to bypassed operation in comparison to conventional techniques.

According to further aspects, torque ripple reduction can be achieved by using a two-ramp starting technique in which the RVSS switches to steeper ramp once the sensed motor current diminishes to a certain level (e.g., around 270% of the motor's full load rated current). During execution of the steeper ramp, durations of "on" times of the semiconductor switches are constrained to be uniform for a given cycle of an AC reference signal as described above. This can help avoid a half-wave asymmetry that can introduce a DC offset that may destabilize the motor. In some embodiments, the duration of the steeper ramp may be approximately equal to a stator time constant of the motor.

According to still further aspects, a similar technique may be used for motor deceleration, with a relatively steep initial downward ramp to take the motor voltage from 100% of the source voltage to, for example, about 55% to about 65% of the source voltage. During execution of this descending ramp, the durations of the "on" times of the semiconductor switches are constrained to be uniform for a given cycle of the AC reference signal to help avoid destabilizing the motor. The duration of the relatively steep ramp may be approximately equal to about one-half of the motor's stator time constant. The steep ramp may be followed by a more gradual ramp.

Figure 1:
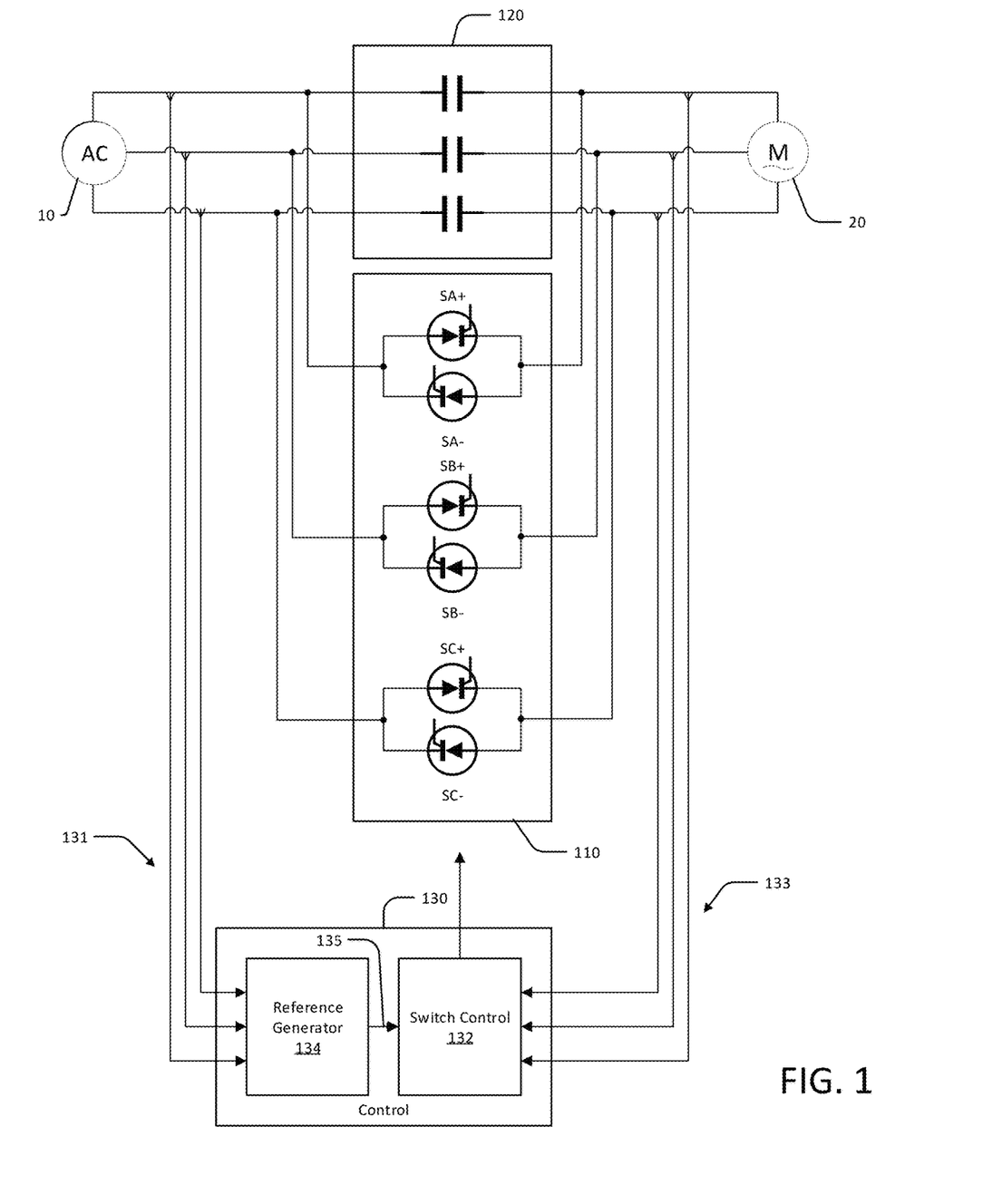
FIG. 1 is a schematic diagram illustrating a reduced voltage soft starter (RVSS) according to some embodiments.

FIG. 1 illustrates an RVSS apparatus according to some embodiments. The apparatus includes an RVSS circuit 110 including pairs of anti-parallel connected thyristors SA+/SA−, SB+/SB−, SC+/SC−, which are configured to selectively couple respective phases of an AC source 10 to respective phases of a motor 20. A bypass switch (e.g., a three-phase contactor) 120 is configured to bypass the RVSS circuit 110 in order to connect the AC source 10 directly to the motor 20. The RVSS circuit 110 and the bypass switch 120 are controlled by a switch control circuit 132 of a control circuit 130. The switch control circuit 132 operates responsive to an AC reference signal 135 that is derived from phase voltage signals 131 that are indicative of phase voltages of the AC source 10 and responsive to current feedback signals 133 that are indicative of phase currents of the motor 20. The AC reference signal 135 may be generated by, for example, an open-delta potential transformer that derives a single-phase voltage from the phase voltages of the AC source 10.

Figure 2:
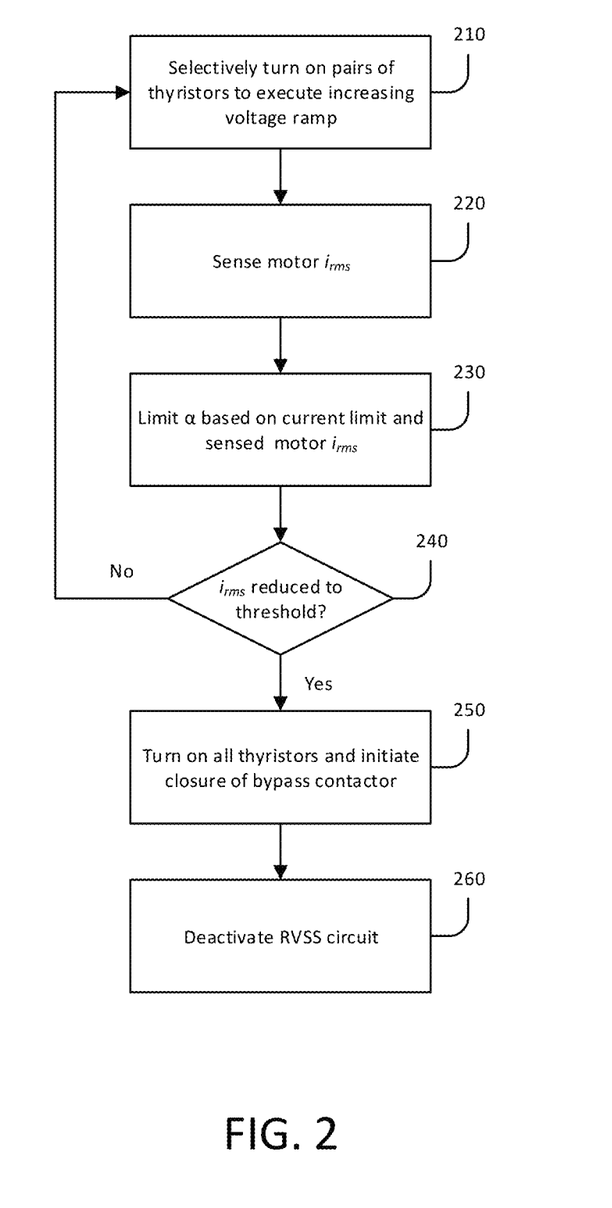
FIG. 2 is a flowchart illustrating motor starting operations of the RVSS apparatus of FIG. 1 according to some embodiments.

FIG. 2 illustrates motor startup operations that may be implemented in the starter apparatus illustrated in FIG. 1 according to some embodiments. An increasing voltage ramp is executed by selectively turning on pairs of the thyristors SA+/SA−, SB+/SB−, SC+/SC− (block 210). For example, during execution of the increasing voltage ramp, a firing angle α (or similar timing metric for triggering the thyristors) may be gradually decreased such that "on" times of the activated pairs gradually increase. As the ramp is executed, an RMS current of the motor 20 is monitored using an RMS current determination technique (block 220). As the motor ramps up, the motor current may increase to a current limit for the RVSS circuit. Changes in α may be limited based on whether the sensed current exceeds the current limit (block 230).

Typically, the RVSS circuit 110 will be current-limited as the motor approaches an up-to-speed condition, at which point the motor current will begin to fall again. When the sensed motor current falls to a threshold value, closure of the bypass switch 120 is initiated and all of the thyristors SA+/SA−, SB+/SB−, SC+/SC—are simultaneously turned on to apply full voltage to the motor 20 (blocks 240, 250). After sufficient time has passed to ensure that the mechanical bypass switch 120 has fully closed (e.g., 100-120 milliseconds), the RVSS circuit 110 may be deactivated (block 260).

Figure 3:
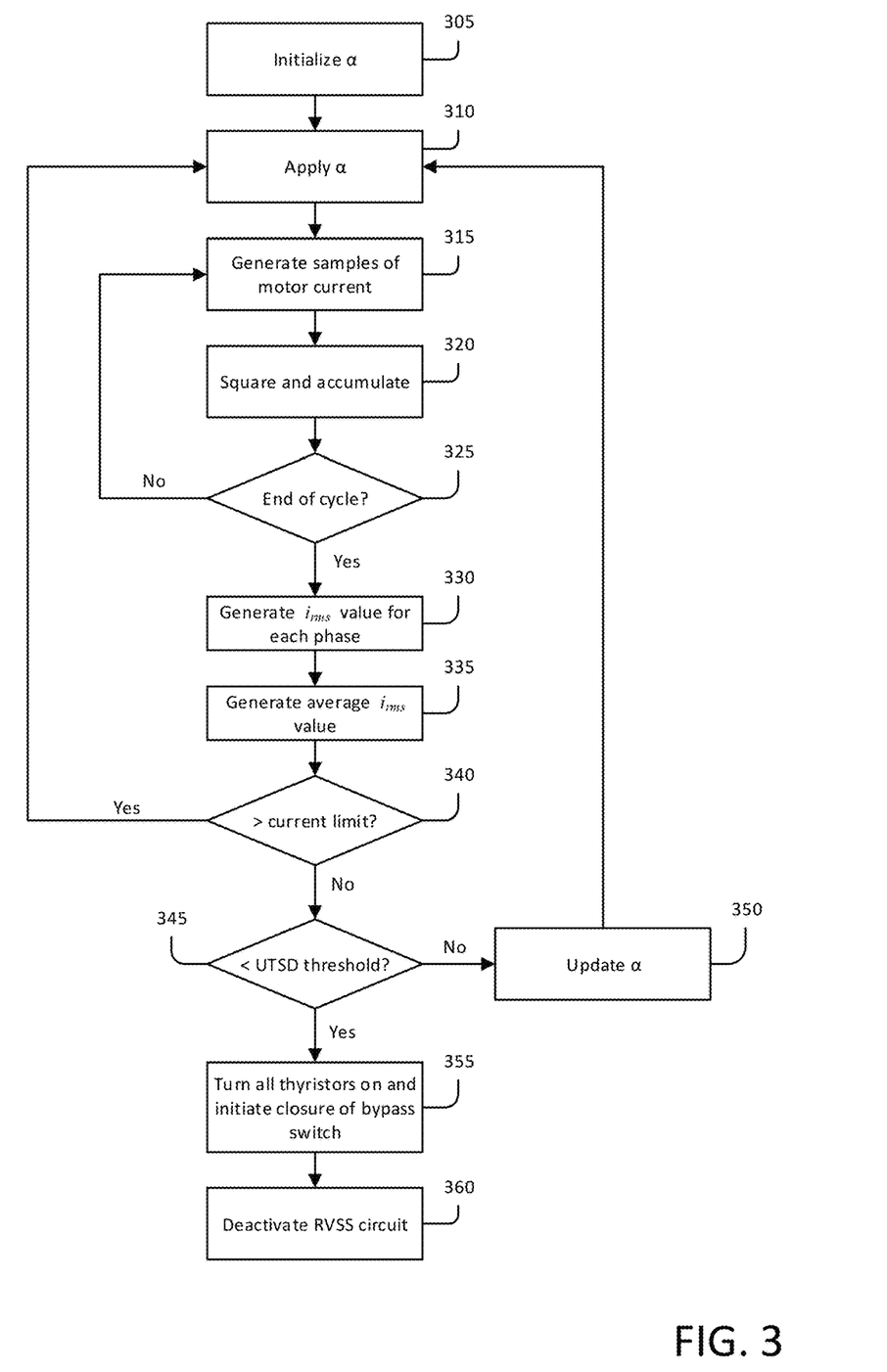
FIG. 3 is a flowchart illustrating a fast root-mean-square (RMS) current calculation for the operations of FIG. 2.

According to some aspects, the UTSD current threshold for this process can be relatively low (e.g., on the order of 135% or less of a motor full rated current) due to the use of a fast RMS current determination technique. This can allow the shaft speed of the motor to approach a synchronous value compared to a full voltage transition when the motor current is at a higher level, which may cause a sudden uptick of speed and torque. Referring to FIG. 3, α is initialized (block 305) and applied to begin acceleration of the motor 20 (blocks 305, 310). Samples of phase currents of the motor 20 are generated at a rate substantially greater than a frequency of the AC reference signal 315 (e.g., 85 samples per cycle of the AC reference signal 135) (block 315). The samples are squared and accumulated (block 320) and, when the end of a cycle of the AC reference is reached, RMS current values for each phase are generated (blocks 325, 330). The per-phase RMS current values may be averaged to generate a nominal RMS current value (block 335).

If the current limit has not been exceeded and a UTSD criterion is not met, α is updated and applied to the RVSS circuit 110 (blocks 340, 345, 350, 310), with new RMS current values being generated for the next cycle (blocks 315-335). If the nominal RMS current value meets the UTSD criterion (e.g., by the RMS current value falling below a threshold), closure of the bypass switch 120 is initiated and all of the thyristors SA+/SA−, SB+/SB−, SC+/SC− are simultaneously turned on (blocks 345, 355). After the bypass switch 120 fully closes, the RVSS circuit 110 is deactivated (block 360).

Figure 4:
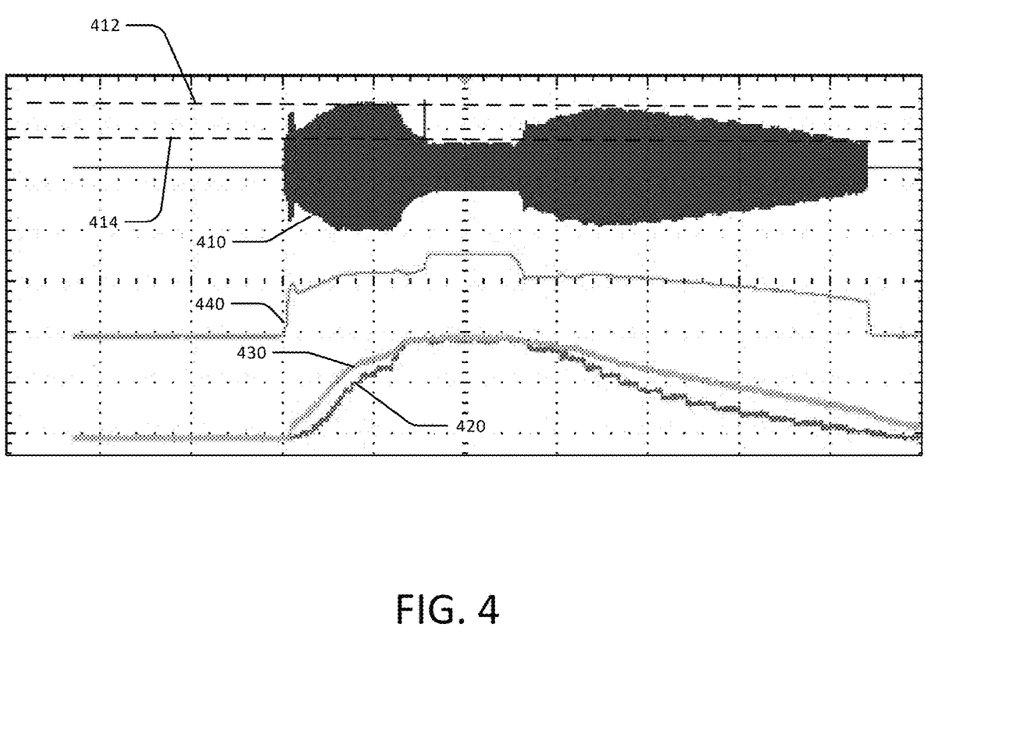
FIG. 4 is a graph illustrating motor current, torque and speed for starting operations according to some embodiments.

The inventors have discovered that transitioning to firing all of the thyristors SA+/SA−, SB+/SB−, SC+/SC− in this manner can reduce torque ripple as the motor 20 transitions to bypassed operation. FIG. 4 illustrates an example of such a transition wherein the motor starter apparatus first applies a voltage ramp that causes a motor current 410 to increase until it reaches a current limit 412 and then eventually decreases as the motor approaches an up-to-speed state. When the motor current 410 falls below an UTSD threshold 414, all the thyristors are turned on and closure of a bypass contactor is initiated. As shown in FIG. 4, this operation can result in a relatively smooth torque curve 420, thus reducing mechanical stress on the motor and/or load. Corresponding shaft speed 430 and RMS line-line motor voltage 440 are also shown in FIG. 4.

Figure 5:
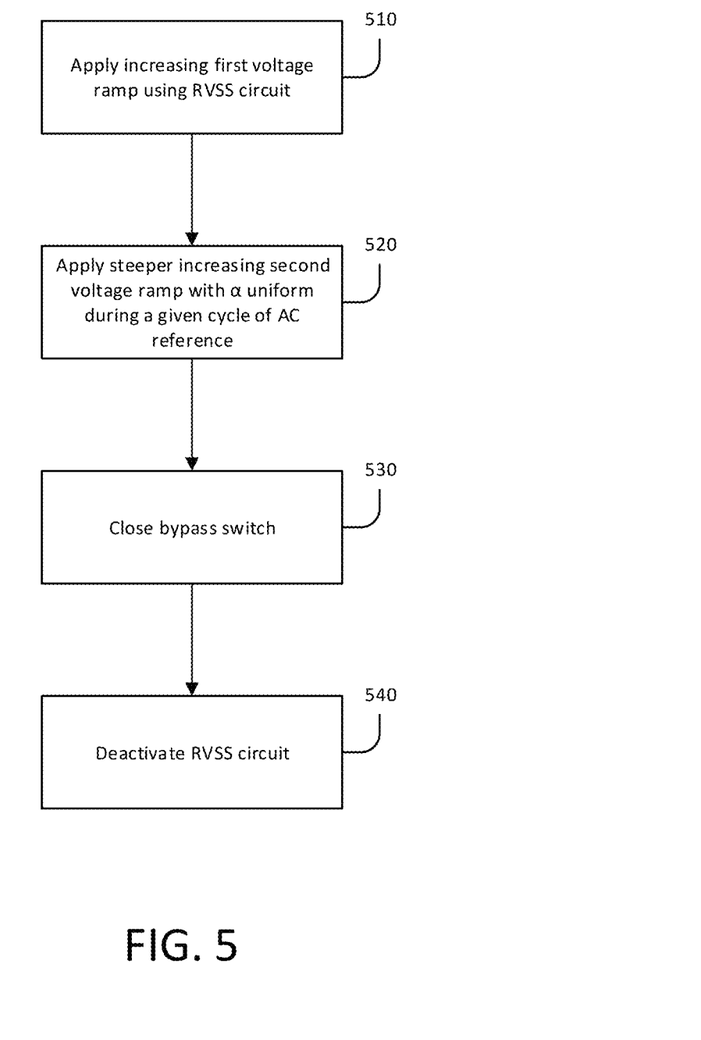
FIG. 5 is a flowchart illustrating motor starting operations employing two ramps for the RVSS apparatus of FIG. 1.

According to further embodiments, a starting procedure using two ramps with different ramp rates may similarly reduce or eliminate torque ripple. Referring to FIG. 5 with continuing reference to FIG. 1, the RVSS circuit 110 may be used to apply an increasing first voltage ramp to the motor 20 (block 510). This ramp may be executed, for example, in a manner similar to that described above with reference to FIG. 3, but it will be appreciated that other techniques may be used. When a certain motor current condition indicating approach to an up-to-speed condition is detected, instead of turning on all of the thyristors SA+/SA−, SB+/SB−, SC+/SC−, a steeper increasing second voltage ramp is then applied (block 520). The threshold for this transition may be different than the UTSD current threshold described above with reference to FIGS. 2 and 3. For example, in some embodiments, the threshold for commencing the second ramp may be around 270% of full rated current. As with the first ramp, the second ramp may be executed by selectively turning on pairs of the thyristors SA+/SA−, SB+/SB−, SC+/SC−. During execution of the steeper second voltage ramp, the firing angles α for each thyristor fired during a given cycle of the AC reference signal 135 are constrained to be uniform, e.g., α may be calculated once for a cycle of the AC reference signal 135 as shown in FIG. 3 and used for any thyristor fired during that cycle. As noted above, this can avoid a half-wave asymmetry that could occur by using non-uniform α during a given cycle. Sometime after the transition to the second ramp, closure of the bypass switch 120 is initiated (block 530). For example, closure of the bypass switch 120 may be initiated after a time delay following detection of an up-to-speed condition and/or when α reaches a certain value, such a value that implies that full voltage (i.e., the full source voltage) is being applied to the motor 20. After closure of the bypass switch 120 is complete, the RVSS circuit 110 is deactivated (block 540).

The second ramp may commence when the motor voltage reaches around 80% of full source voltage and RMS current has fallen to a up to speed detection threshold. In some embodiments, the ramp rate of the second ramp may be about 1.5 to about 5 times greater than the ramp rate of the first ramp. This may result in the motor going from 80% to 100% applied voltage in a time substantially equal to a stator time constant:

$$\tau_{stator}=(L_s+L_m)/R_s,$$

wherein $L_s$ is a stator self-inductance, $L_m$ is a magnetizing inductance and $R_s$ is a stator resistance as defined by the equivalent circuit for an induction motor according to IEEE Std 112. A typical medium-voltage induction motor may have a stator time constant in a range from about 800 milliseconds to about 1.8 seconds.

Figure 6:
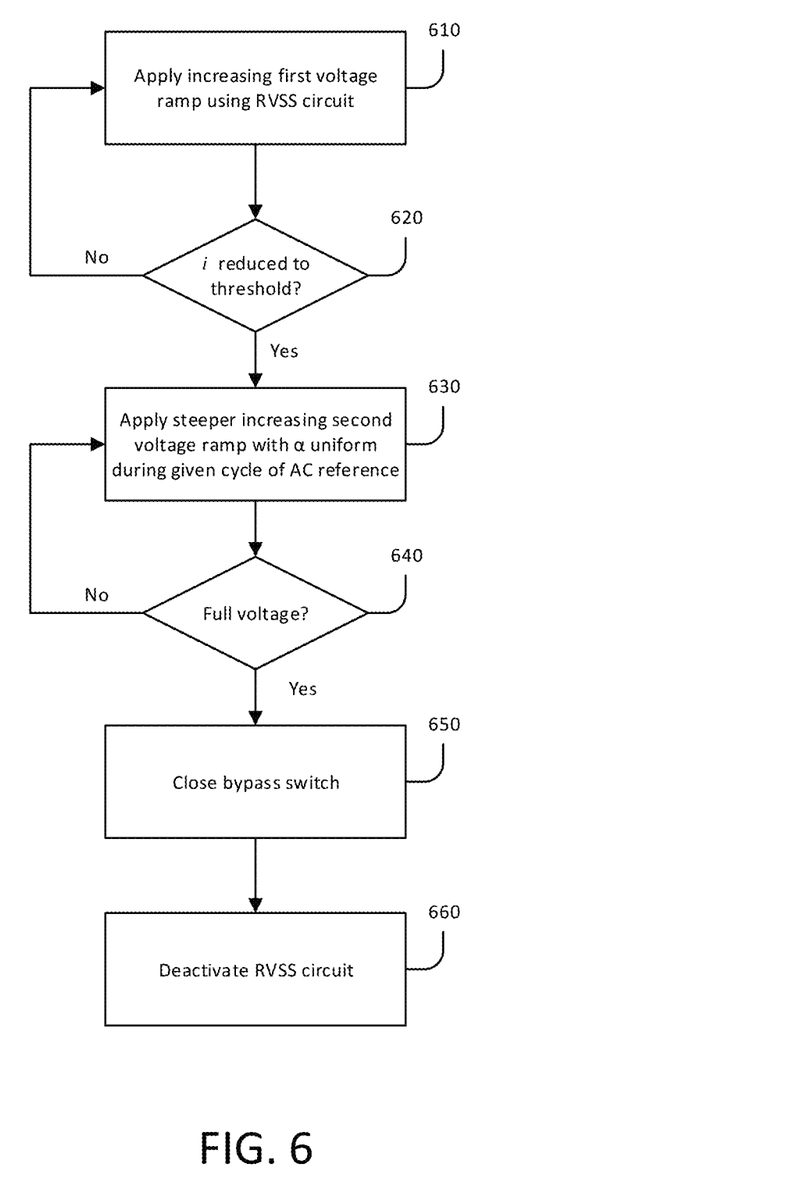
FIG. 6 is a flowchart illustrating two-ramp starting operations according to further embodiments.

FIG. 6 illustrates operation along these lines according to further embodiments. The RVSS circuit 110 applies an increasing first voltage ramp to the motor 20 (block 610). If an RMS current of the motor (e.g., determined as shown in FIG. 3) decreases to a certain level, a second steeper ramp is applied to the motor 20 (blocks 620, 630). During or after execution of this second ramp, closure of the bypass switch 120 is initiated (blocks 640, 650). After the bypass switch 120 has fully closed, the RVSS circuit 110 is deactivated (block 660). In contrast to the operations described above with reference to FIG. 2, the RMS current level at which the RVSS circuit 110 transitions to the second steeper voltage ramp may be substantially greater, e.g., on the order of around 270% of the full rated load current of the motor 20.

Figure 7:
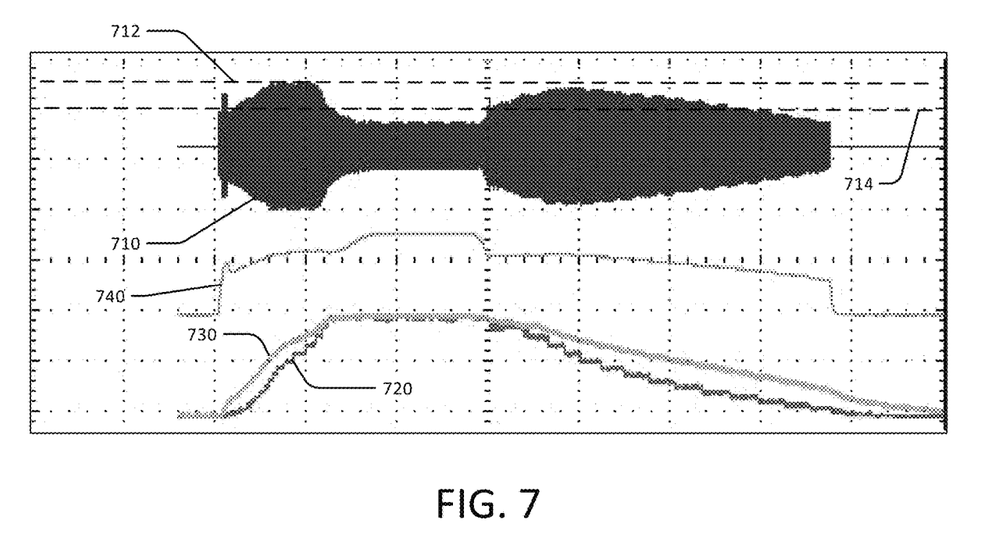
FIG. 7 is a graph illustrating motor current, torque and speed for a two-ramp starting procedure according to further embodiments.

FIG. 7 is a graph illustrating an example of such a transition wherein the motor starter apparatus first applies a voltage ramp that causes a motor current 710 to increase until it reaches a current limit 712. As the motor approaches an up-to-speed state, the current 710 begins to drop. When the motor current 710 falls below an UTSD threshold 714, a second, steeper voltage ramp is applied to the motor and closure of a bypass contactor is initiated. As shown in FIG. 7, this operation results in a relatively smooth torque curve 720, thus limiting mechanical stress on the motor and/or load. Corresponding shaft speed 730 and RMS line-line motor voltage 740 are also shown in FIG. 7.

Figure 8:
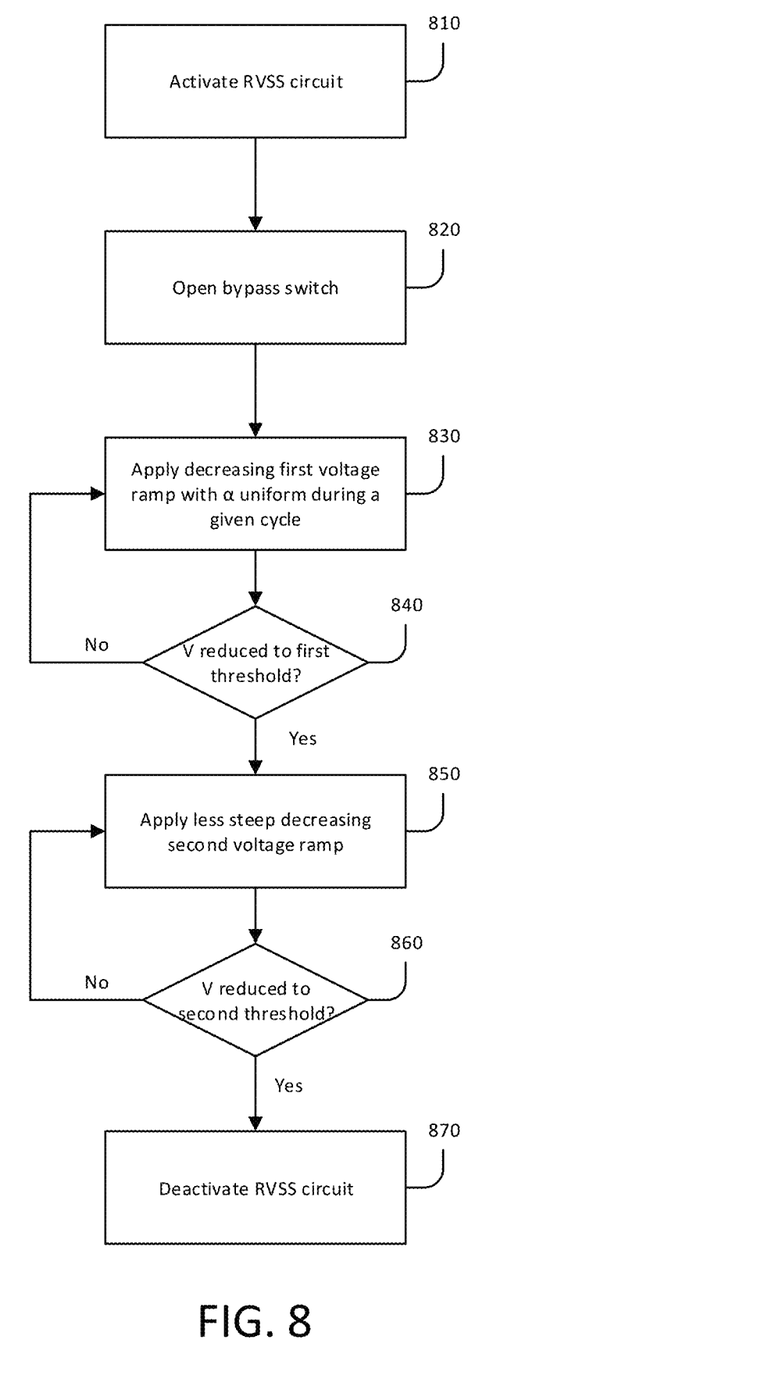
FIG. 8 is a flowchart illustrating motor deceleration operations using a two-ramp procedure for the RVSS apparatus of FIG. 1 according to still further embodiments.

According to still further aspects, a two-ramp process may be used for decelerating the motor 20 from full speed. Referring to FIG. 8, the RVSS circuit 110 is activated and the bypass switch 120 is opened (blocks 810, 820). A first decreasing voltage ramp is applied to the motor 20 (block 830). During execution of the first voltage ramp, the firing angles α for each thyristor fired during a given cycle of the AC reference signal are constrained to be uniform, along the lines described above with reference to FIGS. 5 and 6. When the voltage applied to the motor reaches a first threshold (e.g., about 55% to about 65% of the source voltage), a second, less steep voltage ramp is applied (blocks 840, 850). The first ramp may have a ramp rate sufficient to reach the first threshold in a time equivalent to about one-half of the motor stator time constant. Using an initial ramp with these characteristics can avoid or reduce a torque and phase oscillation that might occur at about 90% to about 95% of the source voltage if a slower ramp were to be used. Responsive to the applied voltage reaching a second threshold (e.g., about 20% of the source voltage), the RVSS circuit 110 is deactivated (blocks 860, 870) and the motor is allowed to further decelerate on its own.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A motor starter comprising:
   a plurality of semiconductor switches configured to couple respective phases of an AC power source to respective phases of a motor; and
   a control circuit configured to configured to selectively operate the semiconductor switches to gradually increase a voltage applied to the motor, to determine root mean square (RMS) current values of a current of the motor as the voltage increases, and to cause the semiconductor switches to concurrently couple all of the phases of the AC power source to corresponding phases of the motor responsive to the RMS current values meeting a criterion.

2. The motor starter of claim 1, wherein the criterion comprises the RMS current values reducing to a value corresponding to about 135% or less of a rated full load current of the motor.

3. The motor starter of claim 1, wherein the control circuit is configured to generate an AC reference signal from the AC power source and to generate the RMS current values once each cycle of the AC reference signal.

4. The motor starter of claim 3, wherein the control circuit is configured to generate per-phase RMS current values for each phase of motor for each cycle of the AC reference signal and to generate the RMS current values for each cycle of the AC reference signal by averaging the per-phase RMS values.

5. The motor starter of claim 4, wherein the criterion comprises the RMS current values reducing to a value corresponding to about 135% or less of a rated full load current of the motor.

6. The motor starter of claim 1, wherein the plurality of semiconductor switches comprises a plurality of pairs of antiparallel-connected thyristors, respective ones of the pairs configured to couple respective ones of the phases of the AC power source to respective ones of the phases of the motor, and wherein the control circuit is configured to turn on all of the thyristors to concurrently couple all of the phases of the AC power source to the corresponding phases of the motor responsive to the RMS current values meeting the criterion.

7. The motor starter of claim 1, further comprising a mechanical bypass switch configured to couple the AC power source to the motor and thereby bypass the plurality of semiconductor switches and wherein the control circuit is configured to initiate closure of the bypass switch responsive to the RMS current values meeting the criterion.

8. A method of operating a motor starter comprising a plurality of semiconductor switches configured to couple respective phases of an AC power source to respective phases of a motor and a mechanical bypass switch configured to couple the AC power source to the motor and thereby bypass the plurality of semiconductor switches, the method comprising:
  selectively operating the semiconductor switches to gradually increase a voltage applied to the motor;
  determining root mean square (RMS) current values of a current of the motor as the voltage increases; and
  causing the semiconductor switches to concurrently couple all of the phases of the AC power source to corresponding phases of the motor responsive to the RMS current values meeting a criterion.

9. The method of claim 8, wherein the criterion comprises the RMS current values reaching a value corresponding to about 135% or less of a maximum full load current (MFLC) of the motor.

10. The method of claim 8, wherein determining the RMS current values comprises generating an AC reference signal from the AC power source and generating the RMS current values once each cycle of the AC reference signal.

11. The method of claim 10, wherein generating the RMS current values once each cycle of the AC reference signal comprises generating per-phase RMS current values for each phase of motor for each cycle of the AC reference signal and generating the RMS current values for each cycle of the AC reference signal by averaging the per-phase RMS values.

12. The method of claim 11, wherein the criterion comprises the nominal RMS current values reducing to a value corresponding to about 135% or less of a maximum full load current (MFLC) of the motor.

13. The method of claim 8, wherein the plurality of semiconductor switches comprises a plurality of pairs of antiparallel-connected thyristors, respective ones of the pairs configured to couple respective ones of the phases of the AC power source to respective ones of the phases of the motor, and wherein causing the semiconductor switches to concurrently couple all of the phases of the AC power source to the corresponding phases of the motor responsive to the RMS current values meeting a criterion comprises turning on all of the thyristors to concurrently couple all of the phases of the AC power source to the corresponding phases of the motor responsive to the RMS current values meeting the criterion.

14. The method of claim 8 wherein the motor starter further comprises a mechanical bypass switch configured to couple the AC power source to the motor and thereby bypass the plurality of semiconductor switches and wherein the method further comprises initiating closure of the bypass switch responsive to the RMS current values meeting the criterion.

15. A motor starter comprising:
  a plurality of semiconductor switches configured to couple respective phases of an AC power source to respective phases of a motor; and
  a control circuit configured generate an AC reference signal from the AC power source, to operate the semiconductor switches to apply a first voltage ramp to the motor to accelerate the motor and to apply a second voltage ramp steeper than the first voltage ramp responsive to detecting a decrease in a current of the motor during execution of the first voltage ramp, wherein application of the second voltage ramp comprises turning on individual pairs of the semiconductor switches for durations that increase as the second voltage ramp is executed but that are uniform for each given voltage cycle of the AC reference signal.

16. The motor starter of claim 15, wherein a duration of the second voltage ramp is substantially equal to a stator time constant of the motor.

17. The motor starter of claim 15, further comprising a mechanical bypass switch configured to couple the AC power source to the motor to bypass the plurality of semiconductor switches and wherein the control circuit is configured to initiate closure of the bypass switch responsive to the second voltage ramp.

18. The motor starter of claim 17, wherein the control circuit is configured to initiate closure of the bypass switch responsive to lapse of a predetermined time delay and/or responsive to a timing metric for the semiconductor switches reaching a predetermined threshold.

19. The motor starter of claim 15, wherein the second voltage ramp has a ramp rate of about 1.5 to about 5 times greater than a ramp rate of the first voltage ramp.

20. The motor starter of claim 15, wherein the control circuit is configured to detect a current of the motor and to initiate the second voltage ramp responsive to the detected current.

* * * * *

UNITED STATES PATENT AND TRADEMARK OFFICE
CERTIFICATE OF CORRECTION

| | |
|---|---|
| PATENT NO. | : 11,128,240 B1 |
| APPLICATION NO. | : 16/992912 |
| DATED | : September 21, 2021 |
| INVENTOR(S) | : Tang et al. |

It is certified that error appears in the above-identified patent and that said Letters Patent is hereby corrected as shown below:

On the Title Page

(73) Assignee: Please correct Assignee to read -- Eaton Intelligent Power Limited (IE) --

In the Specification

Column 7, Line 28: Please correct "a reaches a certain" to read -- $\alpha$ reaches a certain --

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*